United States Patent
Liang (10) Patent No.: US 8,373,350 B2
(45) Date of Patent: Feb. 12, 2013

(54) FIXED-TIME, FIXED-FREQUENCY, PREHEAT-TYPE BALLAST CIRCUIT FOR FLUORESCENT LIGHT TUBE

(75) Inventor: Jim-Hung Liang, Taipei (TW)

(73) Assignee: Skynet Electronic Co., Ltd., Taipei (TW)

( * ) Notice: Subject to any disclaimer, the term of this patent is extended or adjusted under 35 U.S.C. 154(b) by 283 days.

(21) Appl. No.: 12/926,508

(22) Filed: Nov. 23, 2010

(65) Prior Publication Data
US 2012/0081026 A1    Apr. 5, 2012

(30) Foreign Application Priority Data
Oct. 5, 2010   (TW) ............................... 99133792 A (51) Int. Cl.
H05B 37/02    (2006.01)
G05F 1/00    (2006.01)
(52) U.S. Cl. ........................ 315/224; 315/291
(58) Field of Classification Search .................. 315/224, 315/276, 244, 291, 49, 64, 65, DIG. 2, DIG. 4, 315/DIG. 7
See application file for complete search history.

(56) References Cited

U.S. PATENT DOCUMENTS

| | | | | |
|---|---|---|---|---|
| 5,541,829 A | * | 7/1996 | Maehara et al. | 363/34 |
| 5,550,436 A | * | 8/1996 | Houk | 315/209 R |
| 5,920,155 A | * | 7/1999 | Kanda et al. | 315/307 |
| 7,176,639 B2 | * | 2/2007 | Hu et al. | 315/307 |
| 7,847,490 B2 | * | 12/2010 | Kubota et al. | 315/307 |

* cited by examiner

Primary Examiner — Minh D A
(74) Attorney, Agent, or Firm — Bacon & Thomas, PLLC (57) ABSTRACT

The present invention is to provide a ballast circuit, which includes a preheat circuit configured to perform a fixed-time, fixed-frequency preheating process on filaments at both ends of a fluorescent light tube before it is lit. While the filaments are being preheated, a power driving circuit generates an output signal whose frequency is far higher than resonant frequency of a resonant circuit, and controls the preheat circuit for enabling a filament transformer and a high-frequency coupling capacitor in the preheat circuit to couple the voltage of the output signal to the filaments and thereby preheat the filaments, but not light up the light tube. When the preheat period is up, the power driving circuit stops the preheating process and changes the frequency of the output signal to a level close to the resonant frequency, thereby oscillating the resonant circuit and generating a high voltage enough for lighting the light tube.

4 Claims, 10 Drawing Sheets

FIXED-TIME, FIXED-FREQUENCY, PREHEAT-TYPE BALLAST CIRCUIT FOR FLUORESCENT LIGHT TUBE

FIELD OF THE INVENTION

The present invention relates to a ballast circuit for a fluorescent light tube, which utilizes a preheat circuit to perform a fixed-time and fixed-frequency preheating process on filaments at both ends of the fluorescent light tube before the fluorescent light tube is lit by the ballast circuit. Thus, when the fluorescent light tube is lit, the filaments are already surrounded by the plethora of hot electrons generated during the preheat period and are therefore effectively prevented from a sputter effect which may otherwise result if the filaments are hit by argon ions. In consequence, the loss of the electron powder coated on the filaments is significantly reduced and the lifespan of the fluorescent light tube is substantially extended.

BACKGROUND OF THE INVENTION

Figure 1:
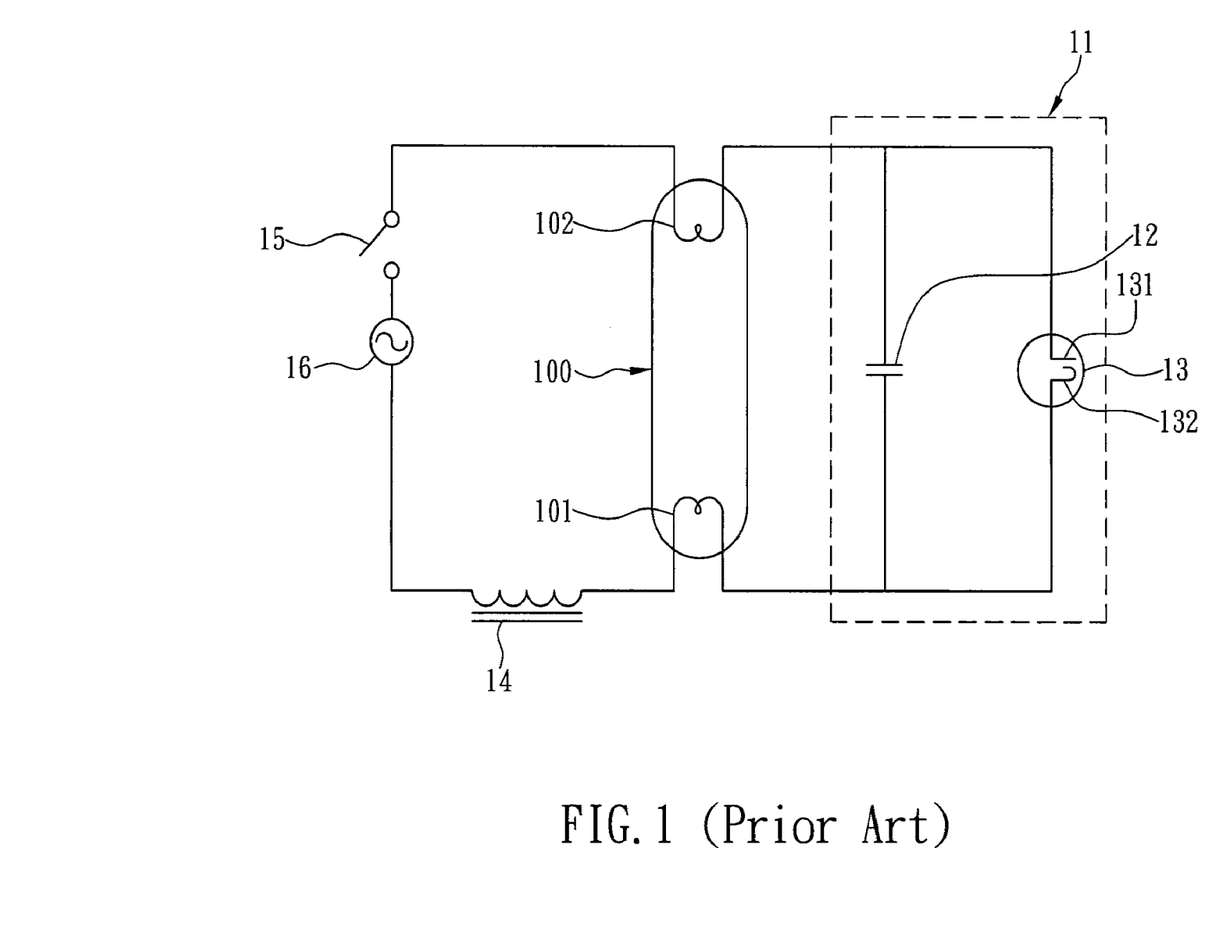
FIG. 1 is a circuit diagram of a conventional ballast circuit for a fluorescent lamp.

The principle on which a common fluorescent lamp emits light is briefly stated as follows. Referring to FIG. 1, a glass light tube 100 defines a closed space therein, and the closed space is filled with an inert gas, such as argon (Ar), and a small amount of mercury (Hg). The inner wall of the light tube 100 is coated with a phosphor layer. The two ends of the light tube 100 are provided with filaments 101, 102 respectively. Each filament 101, 102, basically a tungsten filament normally coated by $BaCO_3$, has one end connected to a starter 11 and the other end connected to an alternating current (AC) power source 16 by way of a ballast 14 and a switch 15. The starter 11 is composed essentially of a capacitor 12 and a small neon lamp 13 connected in parallel. The small neon lamp 13 is filled with neon (Ne) and provided with two electrodes 131, 132 which form an open circuit during the OFF period. The electrode 132 is made of a bimetal strip. When heated, the electrode 132 curves and contacts with the other electrode 131 to form a short circuit. The ballast 14 is an inductor working in conjunction with the AC power source 16 and the starter 11 and is configured to control the current flowing through the starter 11 and the light tube 100.

As shown in FIG. 1, when the switch 15 is turned on, the neon between the two electrodes 131, 132 of the small neon lamp 13 is discharged and thus generates heat, which causes the bimetal electrode 132 to curve. The curved electrode 132 makes electrical contact with the other electrode 131 and thereby forms a short circuit. In consequence, the current in the small neon lamp 13 runs through and heats the filaments 101, 102, and the heated filaments 101, 102 generate a large amount of hot electrons. As the starter 11 is now in the short-circuit state, there is no voltage across the light tube 100. The short circuit between the two electrodes 131, 132 also cuts off the voltage applied to the neon between the electrodes 131, 132, so the neon is no more discharged and stops generating heat. As a result, the bimetal electrode 132 begins to cool and separates from the other electrode 131, thus instantly terminating the current to the starter 11; the filaments 101, 102; and the ballast 14. Due to the abrupt interruption of current in the ballast (inductor) 14, an oscillation takes place and generates a high voltage at the capacitor 12. The high voltage ionizes the argon in the light tube 100 into argon ions and free electrons, which are accelerated by the externally applied voltage and hit the liquid mercury dispersed in the light tube 100; thus, the liquid mercury is vaporized. While the mercury vapor is hit by the high-speed electrons, the electrons in the mercury atoms undergo energy level transition and generate ultraviolet light. The ultraviolet light, upon striking the phosphor powder on the inner wall of the light tube 100, is converted into visible light. Once the light tube 100 is lit, the inductor 14 serves as an important component for limiting the lamp current and is therefore also known as a ballast or current stabilizer. This type of ballasts are the most typical ballast circuits for fluorescent lamps since the invention of fluorescent lighting and are configured to light fluorescent light tubes at the mains frequency. To sum up, a ballast circuit lights up a fluorescent light tube mainly by the following steps:

1. preheating the filaments at both ends of the fluorescent light tube;
2. generating a high voltage to ionize the argon in the light tube; and
3. stabilizing or limiting the lamp current in the light tube once the light tube is lit.

However, with the advent of the electronic era, it has been found that the lighting efficiency of a fluorescent light tube can be effectively increased by lighting the light tube at a frequency of a few tens kHz. Therefore, in recent years, various electronic ballast circuits have been developed for fluorescent lamps and widely used in fluorescent lighting fixtures. As such, electronic ballast circuits have gradually replace magnetic ballast circuits, which are composed mainly of silicon steel plates and have such disadvantages as bulkiness, heavy weight, and a short starter service life.

Of course, an electronic ballast circuit must also follow the foregoing steps when lighting a fluorescent light tube, although the method for preheating the filaments may vary. The preheating techniques, and whether they are carried out adequately, are an important factor that influences the service life of light tubes. A description of two common preheating methods and their drawbacks follows.

Figure 2:
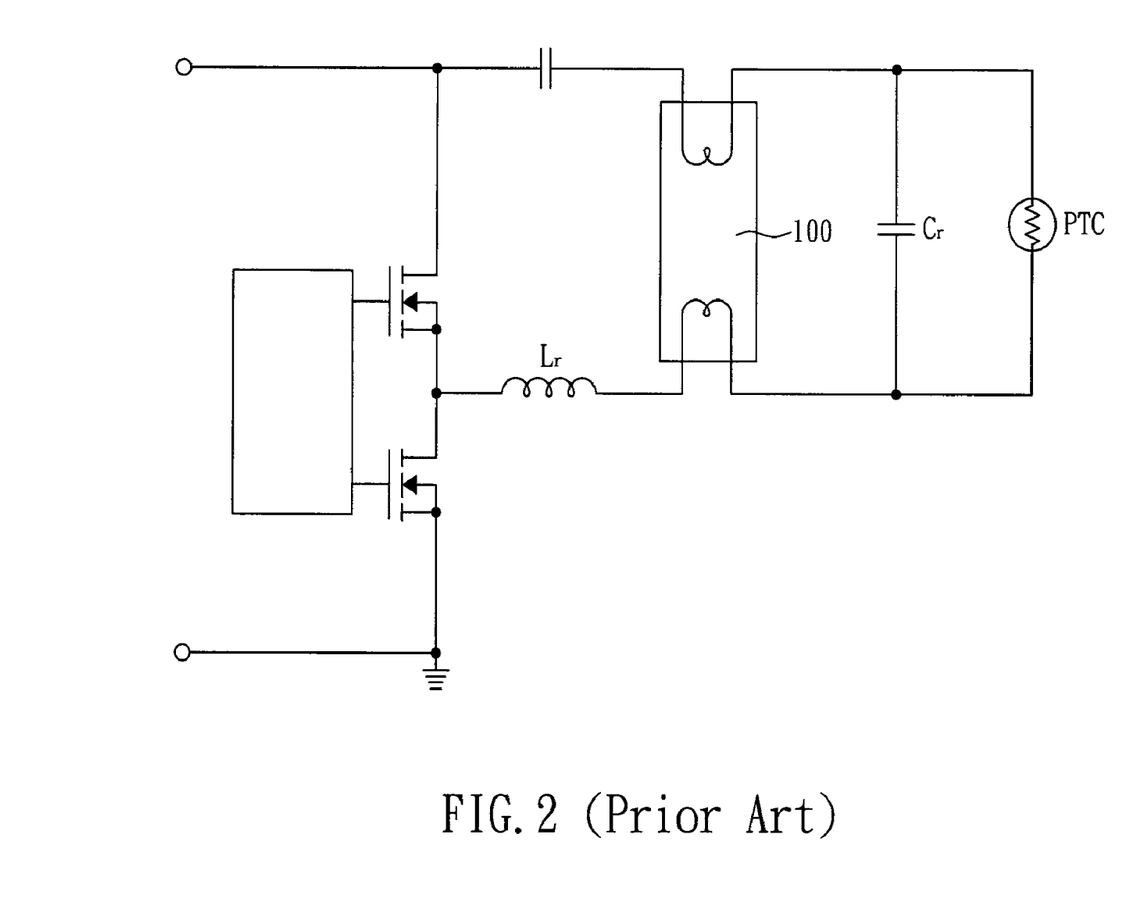
FIG. 2 is a circuit diagram of a conventional preheat-type electronic ballast.

1. PTC preheat-type electronic ballasts: Referring to FIG. 2, the basic structure of this type of electronic ballasts is a half-bridge LC resonant circuit, wherein a positive temperature coefficient (PTC) resistor $R_{PTC}$ is connected in parallel to a resonant capacitor $C_r$. A PTC resistor is characterized in that its resistance is only a few ohms at normal temperature but can rise instantly to several megaohms when heated by a current flowing therethrough. Therefore, when the ballast is just turned on, the low resistance of the PTC resistor $R_{PTC}$ allows a relatively large current to flow through and thereby heat the filaments at both ends of the light tube 100. As the PTC resistor $R_{PTC}$ itself is heated at the same time, its resistance soon rises to several megaohms, thereby turning the PTC resistor $R_{PTC}$ into a substantially open circuit. During this process, the oscillation voltage of the LC resonant circuit (composed of the resonant capacitor $C_r$ and a resonant inductor $L_r$) is gradually increased, and a voltage high enough to ionize argon is eventually generated at the resonant capacitor $C_r$ to light the light tube 100. However, as the properties of mass-produced PTC resistors are inconsistent, it is not uncommon that a light tube is lit when its filaments are not yet sufficiently preheated. Should that happen, the argon atoms are very likely to hit and thus damage the filaments, causing the filaments to break prematurely. Because of that, a PTC preheat-type electronic ballast generally only allows a fluorescent light tube to be lit approximately 5000 times. Besides, as PTC components are in a high-temperature (100~130° C.) state for a long time, the resultant power loss is at least about 0.5 W to 1 W; in consequence, the overall performance of PTC preheat-type electronic ballasts is significantly compromised.

Figure 3:
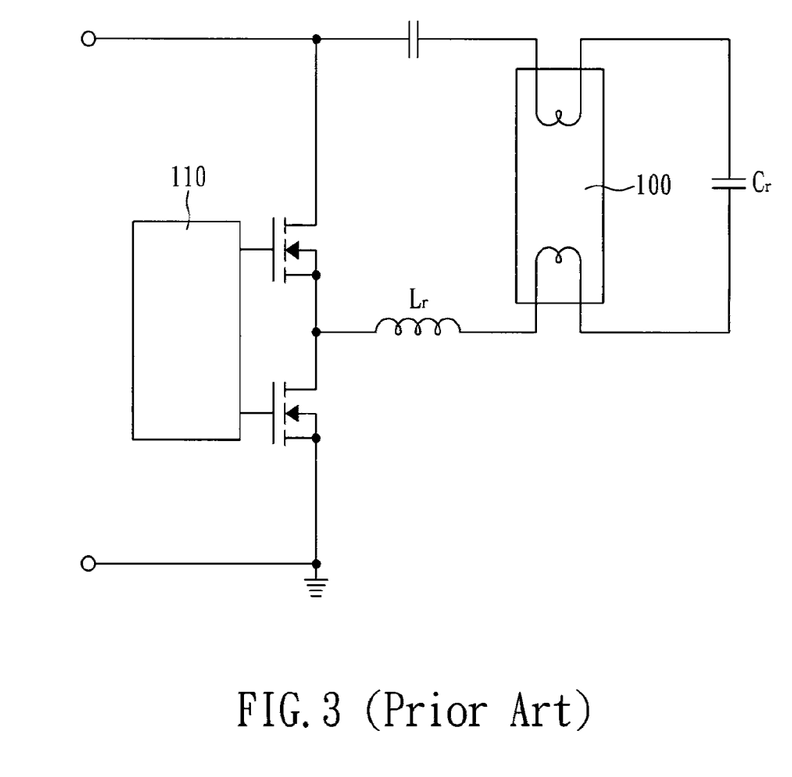
FIG. 3 is a circuit diagram of a conventional variable-frequency, preheat-type electronic ballast.
Figure 4:
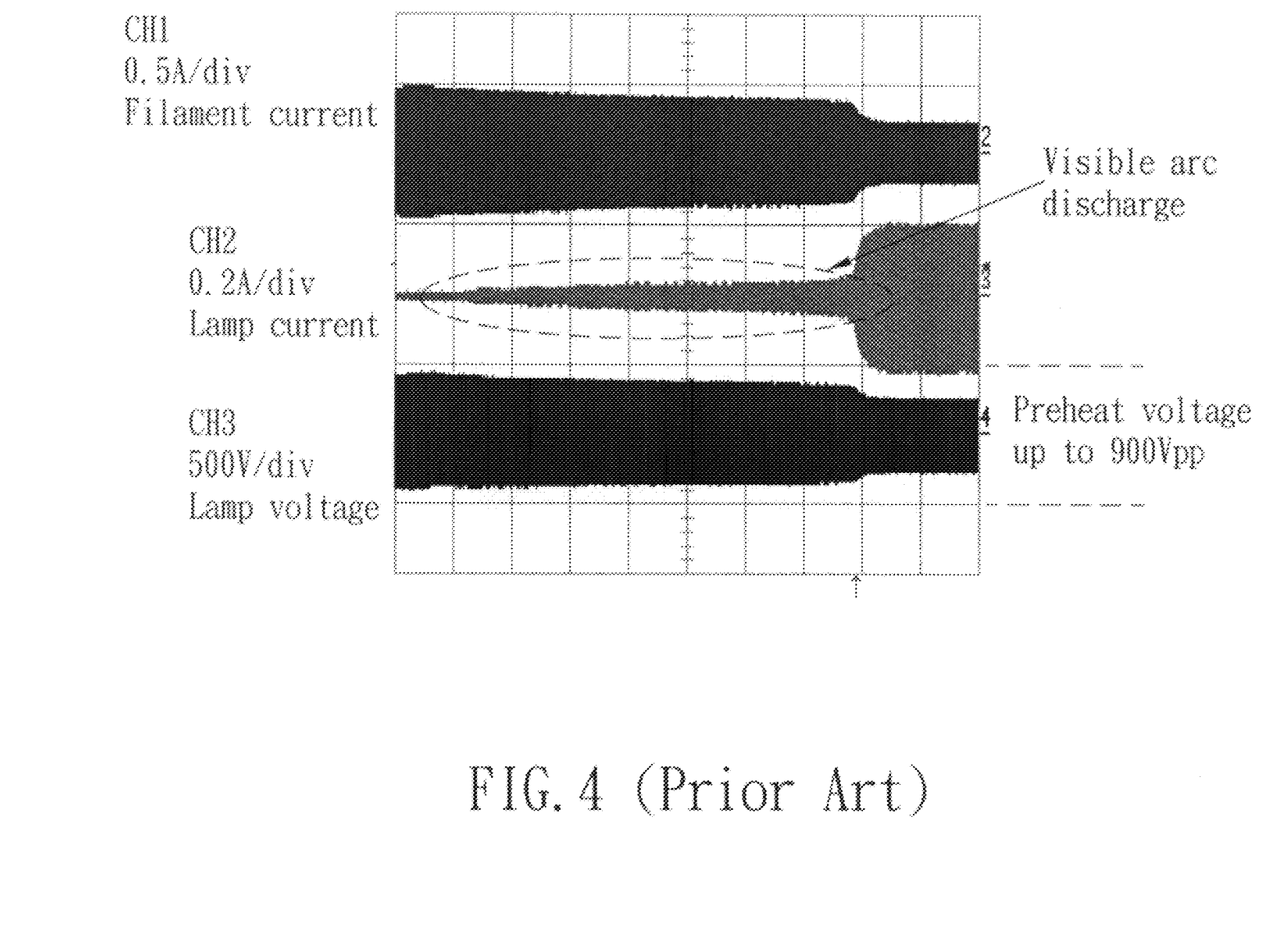
FIG. 4 is a waveform diagram for the filament current, lamp current, and lamp voltage of the conventional variable-frequency, preheat-type electronic ballast depicted in FIG. 3.

2. Variable-frequency preheat-type electronic ballasts: Referring to FIG. 3, the basic structure of a variable-frequency preheat-type electronic ballast is still a half-bridge LC resonant circuit, wherein a resonant capacitor $C_r$ and a resonant inductor $L_r$ constitute the resonant circuit. The preheating process of such an electronic ballast is carried out by a sweep-frequency driving circuit 110 configured to generate a sweep-frequency signal which goes from a high level to a low level and which is used to drive the half-bridge LC resonant circuit. There are quite a few ICs on the market that are designed specifically for this preheating process, such as Philips UBA2021, International Rectifier IR 2156, and so on. The preheating and starting principle employed by the ballast shown in FIG. 3 is as follows. Soon after the ballast is turned on, the sweep-frequency driving circuit 110 generates a driving signal whose frequency is higher than the resonant frequency of the resonant circuit, thus allowing the current flowing through the resonant capacitor $C_r$ to preheat the filaments. At this moment, the voltage at the resonant capacitor $C_r$ is not high enough to light the light tube 100. As the driving signal generated by the sweep-frequency driving circuit 110 approaches the resonant frequency of the resonant circuit, the filament current running through the resonant capacitor $C_r$ is gradually reduced, but the voltage at the resonant capacitor $C_r$ becomes higher and higher and eventually lights up the light tube 100. Nevertheless, there is a blind spot in this design: while the filaments are preheated, the hot electrons generated by the filaments are not accumulated around the filaments but are dispersed in the light tube 100 due to the increasing AC voltage at the resonant capacitor $C_r$. In consequence, there tends to be a measurable glow current in the light tube 100 during the preheat period in which the light tube 100 is not yet lit, as shown in FIG. 4. The glow current, resulting from argon ions hitting the filaments, dislodges the electronic powder coated on the filaments and is hard to control. A feasible approach to reduce the glow current is to lengthen the duration of the high-frequency driving signal, as is adopted by the FAN7710V control IC of FAIRCHILD. However, given the Commission Regulation (EC) No 244/2009 that requires the light tube 100 be lit within one second, whether the FAN7710V control IC is up to the task is yet to be determined.

Therefore, the issue to be addressed by the present invention is to design a ballast circuit which applies substantially no voltage to the light tube while preheating the filaments, which enables the hot electrons generated by the preheated filaments to envelop the filaments before the light tube is lit, and which therefore effectively prevents the filaments from being hit by argon ions when the light tube is lit. Thus, the ballast circuit proposed by the present invention not only ensures that the electronic powder coated on the filaments will not be easily lost, but also significantly increases the service life of the fluorescent light tube.

BRIEF SUMMARY OF THE INVENTION

The present invention provides a fixed-time, fixed-frequency, preheat-type ballast circuit for a fluorescent light tube, wherein the main structure of the ballast circuit is a half-bridge LC resonant circuit. The ballast circuit includes an externally excited power driving circuit, a resonant circuit, and a preheat circuit. The preheat circuit is configured to perform a fixed-time, fixed-frequency preheating process on the filaments at both ends of the fluorescent light tube before the fluorescent light tube is lit by the ballast circuit. While the filaments are being preheated, the power driving circuit generates an output signal whose frequency is far away than the resonant frequency of the resonant circuit so as to not apply to the fluorescent light tube a voltage high enough to light up the light tube. Also, the power driving circuit controls the preheat circuit in such a way that, during the preheat period, a filament transformer and a high-frequency coupling capacitor in the preheat circuit couple the voltage of the output signal to the filaments and thereby preheat the filaments. When the preheat period is up, the power driving circuit stops the preheating process of the preheat circuit and changes the frequency of the output signal to a level close to the resonant frequency of the resonant circuit, thereby oscillating the resonant circuit and generating a high voltage for lighting the light tube.

The primary object of the present invention is to provide the foregoing ballast circuit, wherein the preheat circuit preheats the filaments before the fluorescent light tube is lit, wherein the preheat current supplied from the preheat circuit to the filaments only causes a very low lamp voltage across the fluorescent light tube, and wherein after the filaments are preheated by the preheat current for the preset preheat period, the ballast circuit supplies to the light tube a voltage high enough to light up the light tube immediately. Thus, when the fluorescent light tube is lit, the filaments are already surrounded by the plethora of hot electrons generated during the preheat period and are therefore effectively prevented from a sputter effect which may otherwise result if the filaments are hit by argon ions. In consequence, the loss of the electron powder coated on the filaments is significantly reduced, and the portions of the fluorescent light tube that are close to the two filaments will not turn black even after the light tube is lit tens of thousands of times. As the number of times the fluorescent light tube can be lit is greatly increased, the light tube's service life is substantially extended.

It is another object of the present invention to provide the foregoing ballast circuit, wherein both the preheat current and the preheat time can be adjusted according to the design requirements of the ballast circuit, so as to ensure that the filaments are surrounded, right in the preheat period, by the plethora of hot electrons generated during the same period. Hence, it can be further assured that, when the ballast circuit later supplies a sufficiently high voltage to instantly light up the light tube, the free argon ions in the fluorescent light tube are blocked by the hot electrons and prevented from hitting the filaments. As the sputter effect which may otherwise result if the argon atoms hit the filaments is avoided, there will be no measurable glow current in the light tube either during the preheat period or at the instant when the light tube is lit. According to experiment results, the ballast circuit of the present invention can light up a fluorescent light tube more than 500 thousand times without blackening the lamp bases of the light tube.

BRIEF DESCRIPTION OF THE SEVERAL VIEWS OF THE DRAWINGS

The technical means and circuit operation of the present invention can be best understood by referring to the following detailed description of the preferred embodiments in conjunction with the accompanying drawings, in which.

DETAILED DESCRIPTION OF THE INVENTION

Figure 5:
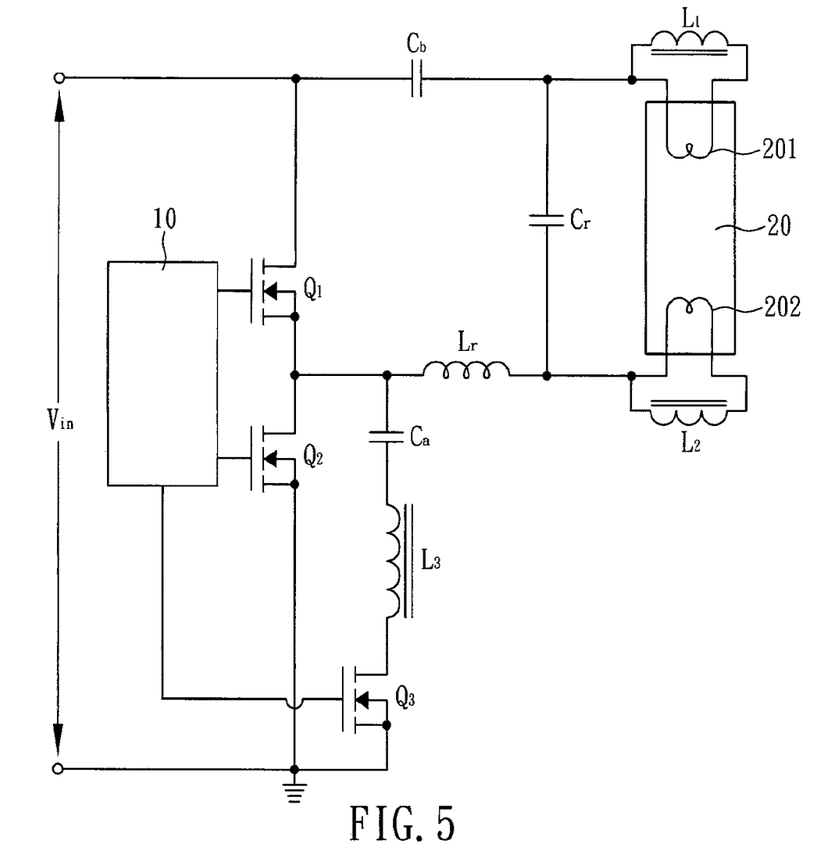
FIG. 5 is a circuit diagram of a ballast circuit according to a first embodiment of the present invention.

The present invention provides a fixed-time, fixed-frequency, preheat-type ballast circuit for a fluorescent light tube, as shown in FIG. 5. The fluorescent light tube 20 has two ends that are provided with a first filament 201 and a second filament 202 respectively. The ballast circuit includes an externally excited power driving circuit, a resonant circuit, and a preheat circuit. The externally excited power driving circuit is composed of a control circuit 10, a first semiconductor switch $Q_1$, a second semiconductor switch $Q_2$, and a third semiconductor switch $Q_3$. The resonant circuit is composed of a resonant capacitor $C_r$ and a resonant inductor $L_r$. The preheat circuit is composed of a filament transformer and a high-frequency coupling capacitor $C_a$.

Referring to FIG. 5, the control circuit 10 is configured to generate at least three output signals, wherein the first and second output signals are voltage signals having the same frequency but alternating waveforms, and the third output signal is a time sequence signal for setting a preheat period. The first semiconductor switch $Q_1$ is a power metal-oxide-semiconductor field-effect transistor (abbreviated hereinafter as Power MOSFET). The gate of the first semiconductor switch $Q_1$ serves to receive the first output signal so that the first semiconductor switch $Q_1$ is switched according to the first output signal. Meanwhile, the drain of the first semiconductor switch $Q_1$ is connected to the positive electrode of a power source V. The second semiconductor switch $Q_2$ is a Power MOSFET, too, and has a gate for receiving the second output signal so that the second semiconductor switch $Q_2$ is switched according to the second output signal. The second semiconductor switch $Q_2$ further has a drain connected to the source of the first semiconductor switch $Q_1$, and a source connected to the negative electrode of the power source $V_{in}$. The third semiconductor switch $Q_3$ is also a Power MOSFET. During the preheat period, the gate of the third semiconductor switch $Q_3$ receives the third output signal so that the third semiconductor switch $Q_3$ is turned on according to the third output signal. The source of the third semiconductor switch $Q_3$ is connected to the negative electrode of the power source V. The filament transformer is composed of three windings $L_1$, $L_2$, $L_3$. The two ends of the first winding $L_1$ are connected to the two ends of the first filament 201 respectively. The two ends of the second winding $L_2$ are connected to the two ends of the second filament 202 respectively. The third winding $L_3$ has one end connected to the drain of the third semiconductor switch $Q_3$. The two ends of the resonant capacitor $C_r$ are connected to the first winding $L_1$ and the second winding $L_2$ respectively. The resonant inductor $L_r$ is connected between the resonant capacitor $C_r$ and the line connecting the first and second semiconductor switches $Q_1$, $Q_2$. When the control circuit 10 generates the first and second output signals, and the frequency of the first and second output signals is higher than the resonant frequency of the resonant circuit, the resonant circuit generates in response a very low voltage at the resonant capacitor $C_r$ that is insufficient to light up the light tube 20. However, when the frequency of the first and second output signals generated by the control circuit 10 is close to the resonant frequency of the resonant circuit, the resonant circuit generates in response a high voltage at the resonant capacitor $C_r$ that can light up the light tube 20 instantly. The high-frequency coupling capacitor $C_a$ has one end connected between the resonant inductor $L_r$ and the line connecting the first and second semiconductor switches $Q_1$, $Q_2$, and the other end connected to the other end of the third winding $L_3$.

As shown in FIG. 5, when the ballast circuit is turned on, the control circuit 10 sends the third output signal to the third semiconductor switch $Q_3$ so that, according to the third output signal, the third semiconductor switch $Q_3$ is turned on for the preset preheat period. At the same time, the control circuit 10 sends the first and second output signals, whose frequency is higher than the resonant frequency of the resonant circuit, to the first and second semiconductor switches $Q_1$, $Q_2$ respectively, so as for the high-frequency coupling capacitor $C_a$ to couple the voltage of the first output signal and the voltage of the second output signal to the third winding $L_3$ of the filament transformer, thus allowing the first winding $L_1$ and the second winding $L_2$ to receive the voltage required to preheat the filaments 201, 202. Once the preheat period is up, the control circuit 10 turns off the third semiconductor switch $Q_3$ immediately. As a result, the filament transformer is disconnected, receives no more preheat voltage, and stops heating the filaments 201, 202. At the same time, the control circuit 10 sends the first and second output signals, whose frequency is now close to the resonant frequency of the resonant circuit, to the first and second semiconductor switches $Q_1$, $Q_2$ respectively. Thus, by switching the first and second semiconductor switches $Q_1$, $Q_2$, the control circuit 10 brings the resonant circuit into the resonant state, in which an oscillation takes place and generates a voltage high enough to light up the light tube 20. Consequently, the light tube 20 is lit.

Figure 6:
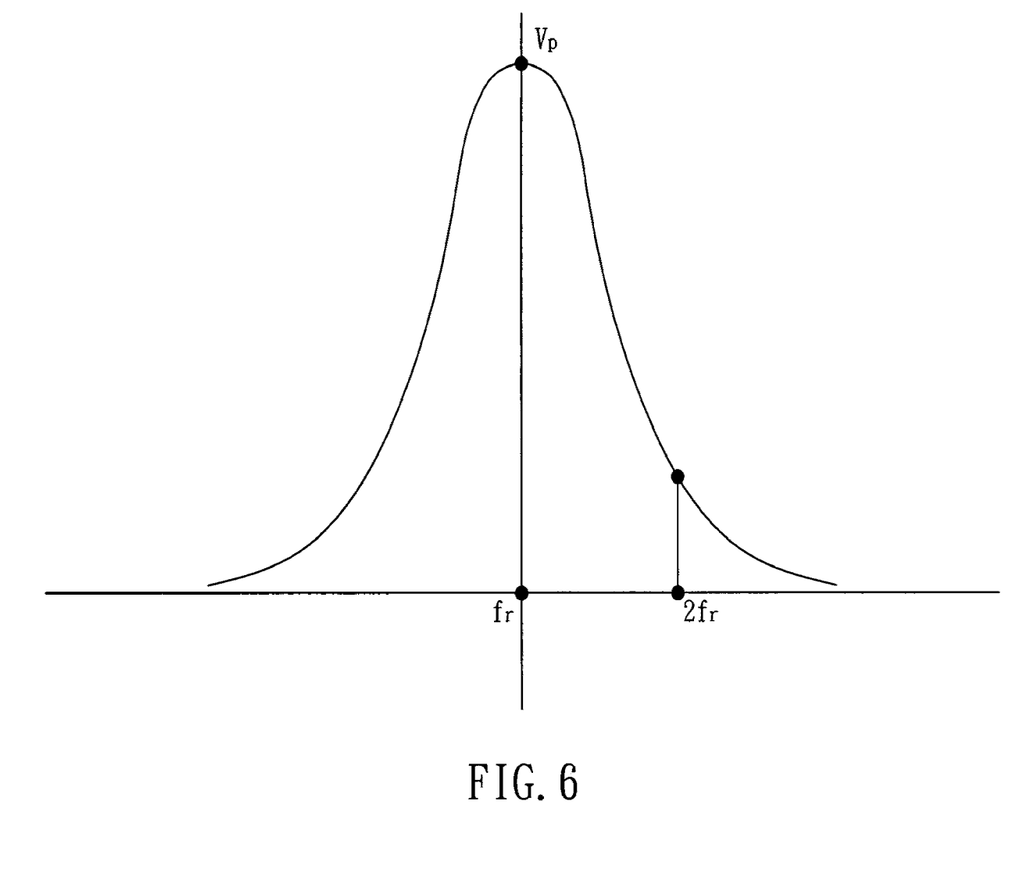
FIG. 6 is a plot showing the relationship between the peak value of a resonant voltage and a resonant frequency.

Please refer to FIG. 6, which shows the relationship between the peak resonant voltage ($V_p$) and the resonant frequency ($f_r$) of the resonant circuit. It can be seen from FIG. 6 that the higher the frequency (e.g., $2f_r$, $f_r$) of the first and second output signals generated by the control circuit 10 is, the lower the peak voltage $V_p$ at the resonant capacitor $C_r$ will be, and therefore the more difficult it will be to light up the light tube 20. However, due to the coupling effect of the high-frequency coupling capacitor $C_a$, the voltages of the high-frequency first and second output signals are coupled to the first and second windings $L_1$, $L_2$ to ensure that the first and second windings $L_1$, $L_2$ receive the voltage required to preheat the filaments 201, 202. This is the basic principle underlying the present invention.

Figure 7:
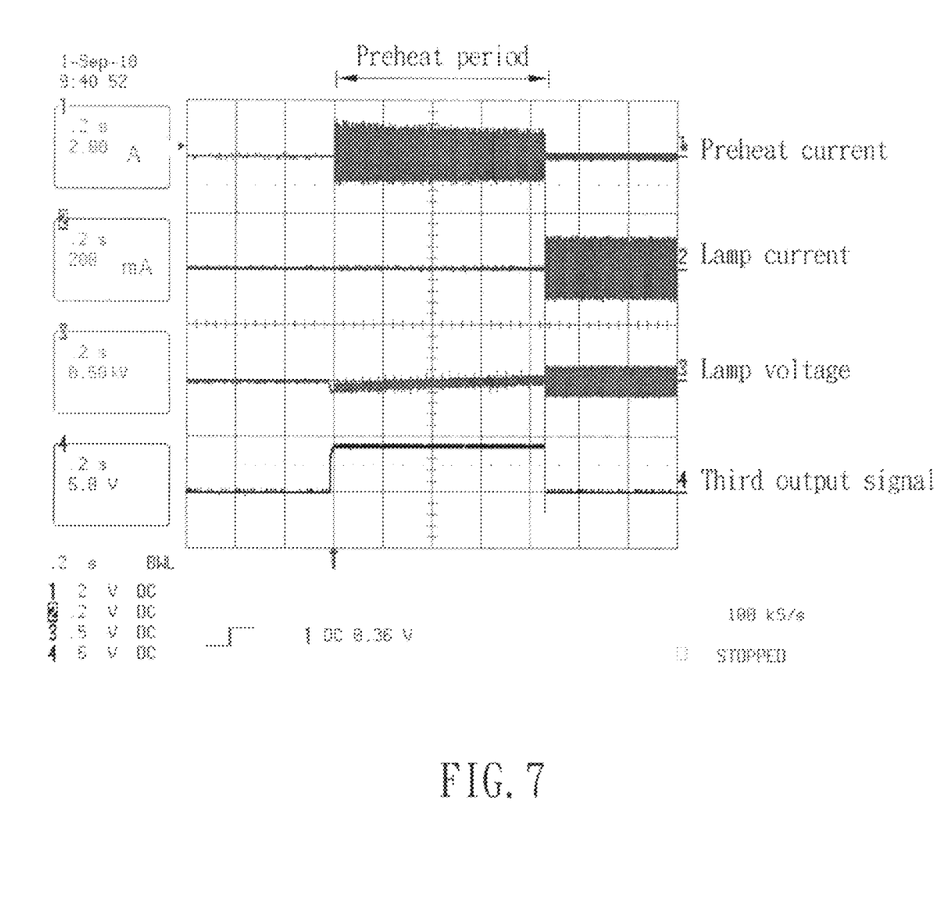
FIG. 7 is a waveform diagram for the preheat current, lamp current, and lamp voltage of a first winding $L_1$ and a second winding $L_2$, as well as for a third output signal, of the ballast circuit of the present invention during the preheat period.
Figure 8:
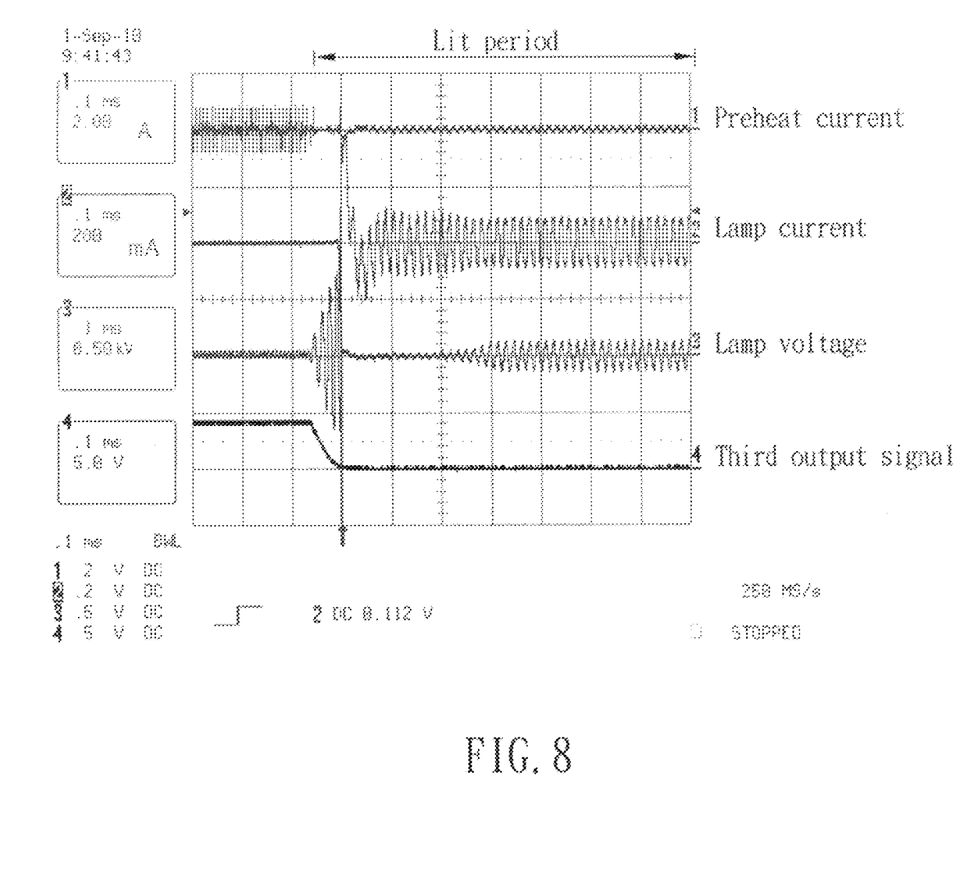
FIG. 8 is a waveform diagram for the preheat current, lamp current, and lamp voltage of the first and second winding $L_1$, $L_2$, as well as for the third output signal, of the ballast circuit of the present invention during the lit period.

To verify the functions of the present invention, the inventor used the disclosed ballast circuit to light a fluorescent light tube and measured the waveforms of the preheat current, lamp current, and lamp voltage at the first and second windings $L_1$, $L_2$ and the waveform of the third output signal at the gate of the third semiconductor switch $Q_3$. The measurement results are presented in FIGS. 7 and 8. Please refer to FIG. 7 for the waveforms of the preheat current, lamp current, and lamp voltage at the first and second windings $L_1$, $L_2$ and the waveform of the third output signal in the preheat period. During the preheat period, the control circuit 10 applies the third output signal to the gate of the third semiconductor switch $Q_3$ to keep the third semiconductor switch $Q_3$ in the ON state. Meanwhile, the first and second windings $L_1$, $L_2$ generate the preheat current and preheat the first and second filaments 201, 202 respectively. The lamp current is almost zero throughout the preheat period. Afterward, with reference to FIG. 8, which shows the waveforms of the preheat current, lamp current, and lamp voltage at the first and second windings $L_1$, $L_2$ and the waveform of the third output signal at the instant when the light tube is lit, the control circuit 10 stops generating the third output signal after the ballast circuit completes preheating the first and second filaments 201, 202. As a result, the third semiconductor switch $Q_3$ enters and remains in the OFF state, and the waveform of the lamp voltage gradually expands until the fluorescent light tube 20 is lit. Once the light tube 20 is lit, the lamp current and the lamp voltage become stable. Therefore, according to the measurement results, the ballast circuit of the present invention was proven effective in substantially reducing the glow current of the fluorescent light tube 20 and preventing the electronic powder coated on the first and second filaments 201, 202 from sputtering (i.e., being dislodged by collision with the huge amount of argon ions generated in the fluorescent light tube 20) at the instant when the light tube 20 is lit. When the present invention is employed, the portions of the fluorescent light tube 20 that are adjacent to the first and second filaments 201, 202 will not turn black even after the light tube 20 is lit tens of thousands of times. Thus, the present invention substantially increases the number of times the fluorescent light tube 20 can be lit and hence the light tube's service life.

Figure 9:
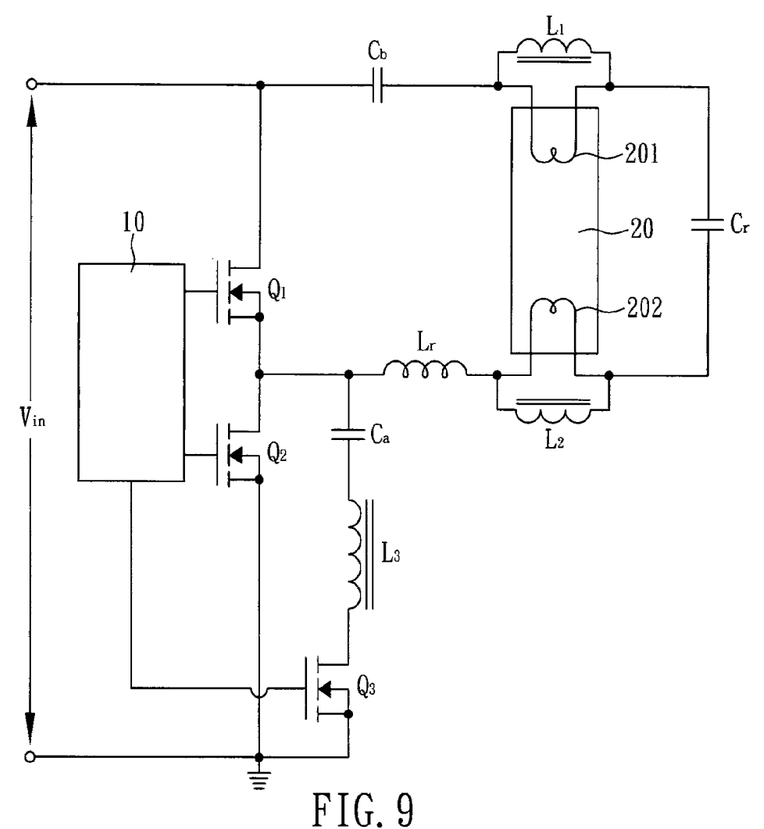
FIG. 9 is a circuit diagram of a ballast circuit according to a second embodiment of the present invention.
Figure 10:
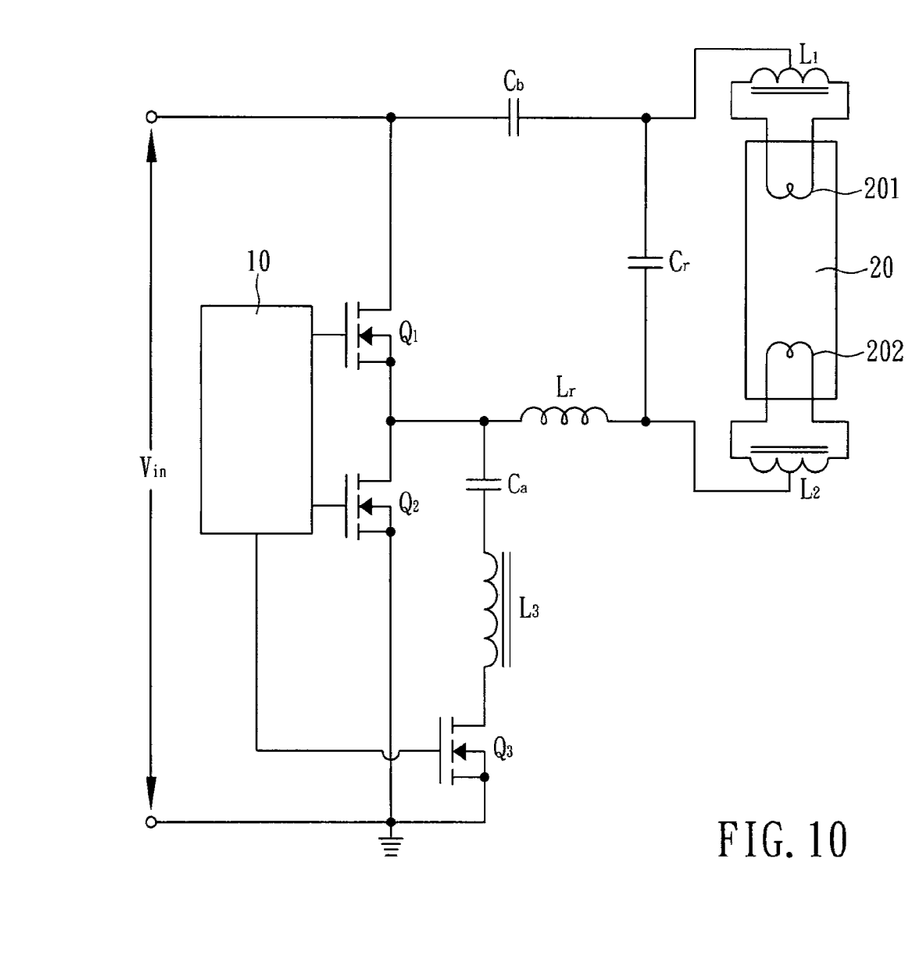
FIG. 10 is a circuit diagram of a ballast circuit according to a third embodiment of the present invention.

It should be pointed out that the semiconductor switches used in the foregoing preferred embodiment are conventional devices provided by way of example only. Implementation of the present invention is by no means limited to the use of such semiconductor switches. For instance, the semiconductor switches can be replaced, as appropriate, by other power switches, including relays, other semiconductor switches, transistors, and so forth. Power switches applicable to the present invention are those capable of receiving the output signals generated by the control circuit 10 and of being switched accordingly. In addition, FIG. 5 is only a simplified circuit diagram of the ballast circuit of the present invention; the ballast circuit may be modified in design according to practical needs when implementing the present invention. For example, referring again to FIG. 5, a blocking capacitor $C_b$ is additionally provided between the resonant circuit and the first semiconductor switch $Q_1$. As another example, referring to FIG. 9 for a second embodiment of the present invention, the resonant capacitor $C_r$ is parallel-connected to the right side of the filaments 201, 202 at the two ends of the light tube 20. As yet another example, referring to FIG. 10 for a third embodiment of the present invention, the two ends of the resonant capacitor $C_r$ are connected to a central position of the first windings $L_1$ and a central position of the second windings $L_2$ respectively, so as for the resonant circuit to generate evenly distributed filament currents in the first and second filaments 201, 202 according to the switching of the first and second semiconductor switches $Q_1$, $Q_2$.

The above embodiments are only a few preferred embodiments of the present invention but are not intended to limit the structural features of the present invention. Therefore, any changes or modifications easily conceivable by a person skilled in the art, such as an addition of other circuits or components to the basic structure of the disclosed ballast circuit in order to add more functions thereto, should fall within the scope of the present invention, which is defined only by the appended claims.

What is claimed is:

1. A fixed-time, fixed-frequency, preheat-type ballast circuit for a fluorescent light tube, the ballast circuit being connected to a first filament and a second filament which are provided respectively at two ends of the fluorescent light tube, the ballast circuit comprising:

a control circuit configured to generate at least three output signals, wherein a first said output signal and a second said output signal are voltage signals having a same frequency but alternating waveforms, and a third said output signal is a time sequence signal for setting a preheat period;

a first power switch configured to receive the first output signal and be switched according to the first output signal, the first power switch having a first end connected to a positive electrode of a power source;

a second power switch configured to receive the second output signal and be switched according to the second output signal, the second power switch having a first end connected to a second end of the first power switch, the second power switch further having a second end connected to a negative electrode of the power source;

a third power switch configured to receive the third output signal so as to be turned on according to the third output signal for the preheat period, the third power switch having a first end connected to the negative electrode of the power source;

a filament transformer comprising three windings, wherein a first said winding has two ends connected to two ends of the first filament respectively, a second said winding has two ends connected to two ends of the second filament respectively, and a third said winding has an end connected to a second end of the third power switch;

a resonant capacitor having two ends connected to the first winding and second winding respectively;

a resonant inductor connected between the resonant capacitor and a line connecting the first power switch and the second power switch, the resonant inductor and the resonant capacitor forming a resonant circuit, wherein the resonant circuit oscillates according to switching of the first power switch and the second power switch and thereby generates a voltage at the resonant capacitor; and a high-frequency coupling capacitor having an end connected between the resonant inductor and the line connecting the first power switch and the second power switch, and an opposite end connected to an opposite end of the third winding;

wherein once the ballast circuit is turned on, the control circuit not only sends the third output signal to the third power switch to thereby turn on the third power switch throughout the preheat period, but also sends the first output signal and the second output signal to the first power switch and the second power switch respectively, wherein the frequency of the first output signal and the second output signal is higher than a resonant frequency of the resonant circuit, so as for the high-frequency coupling capacitor to couple a voltage of the first output signal and a voltage of the second output signal to the third winding, thus allowing the first winding and the second winding to receive a preheat voltage required to preheat the two filaments; and once the preheat period ends, the control circuit not only turns off the third power switch immediately to disconnect the filament transformer, prevent the filament transformer from receiving the preheat voltage, and thereby stop the filament transformer from preheating the two filaments, but also sends the first output signal and the second output signal to the first power switch and the second power switch respectively, wherein the frequency of the first output signal and the second output signal is close to the resonant frequency of the resonant circuit, such that, via the switching of the first power switch and the second power switch, the resonant circuit enters a resonant state, in which an oscillation takes place and generates at the resonant capacitor a voltage high enough to light up the fluorescent light tube.

2. The ballast circuit of claim 1, further comprising a blocking capacitor connected between the resonant circuit and the first power switch.

3. The ballast circuit of claim 2, wherein the two ends of the resonant capacitor are connected to a central position of the first winding and a central position of the second winding respectively.

4. The ballast circuit of claim 3, wherein each of the first power switch, the second power switch, and the third power switch is a power metal-oxide-semiconductor field-effect transistor, the first power switch having a gate for receiving the first output signal and a drain connected to the positive electrode of the power source; the second power switch having a gate for receiving the second output signal, a drain connected to a source of the first power switch, and a source connected to the negative electrode of the power source; the third power switch having a gate for receiving the third output signal, a drain connected to the opposite end of the third winding, and a source connected to the negative electrode of the power source.

* * * * *